United States Patent [19]
Tomita et al.

[11] Patent Number: 4,712,142
[45] Date of Patent: Dec. 8, 1987

[54] IMAGE PICKUP APPARATUS WITH RANGE SPECIFICATION OF DISPLAYED IMAGE

[75] Inventors: Satoru Tomita; Mitsunori Adachi, both of Amagasaki, Japan

[73] Assignee: Mitsubishi Denki Kabushiki Kaisha, Tokyo, Japan

[21] Appl. No.: 884,295

[22] Filed: Jul. 10, 1986

[30] Foreign Application Priority Data

Aug. 27, 1985 [JP] Japan ................................ 60-190738
Aug. 27, 1985 [JP] Japan ................................ 60-190739

[51] Int. Cl.$^4$ .............................................. H04N 1/10
[52] U.S. Cl. ..................................... 358/285; 358/293
[58] Field of Search ............... 358/256, 285, 284, 288, 358/293

[56] References Cited

U.S. PATENT DOCUMENTS 4,424,589  1/1984  Thomas ............................... 358/285

FOREIGN PATENT DOCUMENTS 56-34279  4/1981  Japan .
58-69173  4/1983  Japan .

OTHER PUBLICATIONS

"An Anthropomorphic Retina-like Structure for Scene Analysis", Giulio Sandini et al, Computer Graphics and Image Processing, No. 4, 1980, pp. 365-372.
"Optical Scanning Digitizers", George Nagy, Computer, May 1983, pp. 13-24.
"The Wang Professional Image Computer: A New Dimension to Personal and Office Computing", Frederick A. Wang et al, Proceedings of the IEEE, vol. 72, No. 3, Mar. 1984, pp. 300-311.

Primary Examiner—Michael A. Masinick
Attorney, Agent, or Firm—Lowe, Price, LeBlanc, Becker & Shur

[57] ABSTRACT

In an image pickup apparatus according to the present invention, a rotary scanning mirror (2) is rotated to sense the image of an original (10) by a linear image sensor (4), which in turn outputs picture signals to be stored in a frame memory (5), so that the image of the original (10) is displayed on a display unit (6) on the basis of the stored picture signals. A light pen (9) specifies a scanned range of the image displayed on the display unit (6) and a controller (8) indicates rotation angles of the rotary scanning mirror (2) on the basis of position signals from the light pen (9) to specify the scanned range while varying the step size of the rotary scanning mirror (2) thereby to vary resolution. Thus, a noted region in the original (10) can be easily image-sensed in high resolution.

6 Claims, 17 Drawing Figures

IMAGE PICKUP APPARATUS WITH RANGE SPECIFICATION OF DISPLAYED IMAGE

BACKGROUND OF THE INVENTION

1. Field of the Invention

The present invention relates to an image pickup apparatus. More specifically, it relates to an image pickup apparatus for scanning an original by a reflective mirror to acquire an image of the original.

2. Description of the Prior Art

An image pickup apparatus employing an image scanner or a television camera is well known as means for acquiring images of sheet-type or book-type originals such as documents and drawings. Resolution of a television camera is about 512 pixels×512 lines, while a higher level of resolution, e.g., 2048 pixels×2048 lines may be required for acquiring the. In order to implement an image pickup apparatus of such high resolution, a linear image sensor has generally been combined with some vertical scanning mechanical system.

Well-known examples of such an image pickup apparatus are disclosed in "An Anthropomorphic Retina-like Structure for Scene" reported by Giulio Sandini in "Computer Graphics and Image Processing" No. 4, 1980, pp. 365-372, "Optical Scanning Digitizers" reported by George Nagy in "Computer" May 1983, pp. 13-24 and "The Wang Professional Image Computer: A New Dimension to Personal and Office Computing" reported by Fredrick A. Wang et al., in "Processing of the IEEE" Vol. 72, No. 3, March 1984, pp. 300-311.

Japanese Patent Laying-Open Gazette Nos. 69173/1983 and 34279/1981 also disclose well-known examples of the aforementioned image pickup apparatus.

Figure 1:
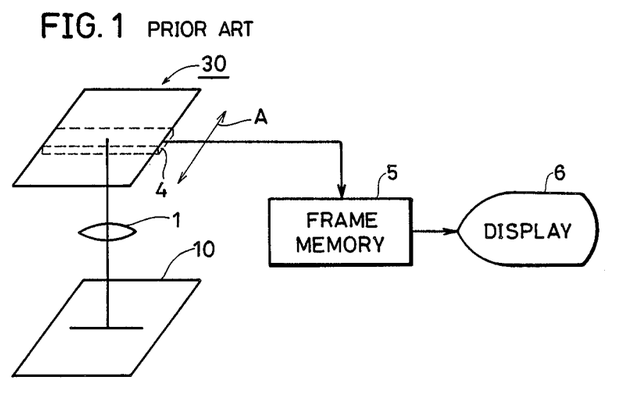
FIGS. 1 and 2 are block diagrams schematically showing conventional image pickup apparatuses.
Figure 2:
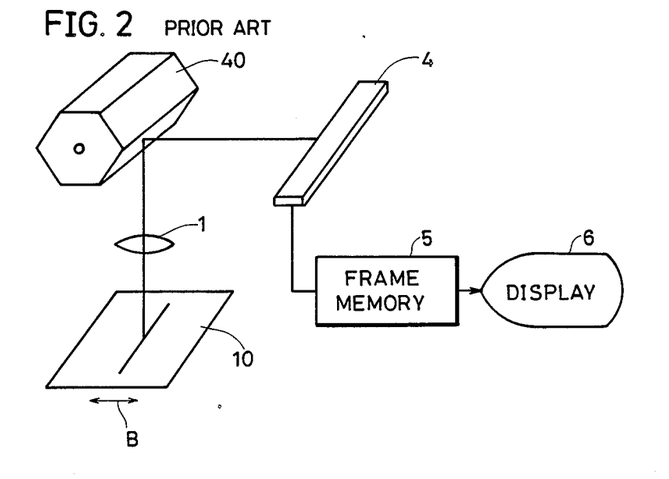

FIGS. 1 and 2 are block diagrams schematically showing the image pickup apparatuses disclosed in the aforementioned Japanese Patent Laying-Open Gazette Nos. 69173/1983 and 34279/1981.

Referring to FIG. 1, a lens 1 is provided above an original 10, to form a two-dimensional image of the original 10 on its image forming plane. The lens 1 is provided on its image forming plane with a linear image sensor 4. The linear image sensor 4 is mounted to a linear sliding mechanism 30, which is slidable in the vertical scanning direction as shown by an arrow A. The linear image sensor 4 is moved in the vertical scanning direction to sense the two-dimensional image of the original 10. Picture signals obtained by the linear image sensor 4 are sequentially stored in a frame memory 5, so that the stored contents are partially displayed as an image on a display unit 6.

On the other hand, the image pickup apparatus as shown in FIG. 2 is provided with a polygonal reflective mirror 40 in place of the linear sliding mechanism 30 as shown in FIG. 1. The polygonal reflective mirror 40 is rotated at a constant speed, to sequentially form the image of linear parts of an original 10, which linear parts are in parallel with the axis of rotation on a linear image sensor 4. Picture signals are thus obtained by vertical scanning through rotation of the polygonal reflective mirror 40 and main scanning through image sensing by the linear image sensor 4 to be stored in the frame memory 5, whose storage contents are partially displayed on the display unit 6.

The aforementioned conventional image pickup apparatuses have been disadvantageous in scanning speed for image acquisition as well as immediateness and full observableness of image display. In the image pickup apparatus as shown in FIG. 1, for example, the linear sliding mechanism 30 can perform vertical scanning while maintaining sufficient mechanical accuracy at about the maximum speed of 10 mm/sec. On the other hand, a pixel-to-pixel interval of the linear image sensor 4 is 13 $\mu$m. If the scanning line interval on the image forming plane in vertical scanning is equalized to the said interval, the maximum scanning speed is 769 line/sec., and hence at least 2.66 seconds are required for entirely scanning one frame (e.g., 2048 lines).

However, in case where an image is displayed on an ordinary display unit such as a CRT requiring refreshment, the entire frames must be repeated at about 30 frame/sec. to prevent trouble such as flicker, as well known in the art of, e.g., television receivers. Thus, the scanning speed of the aforementioned linear sliding mechanism 30 is absolutely insufficient for preventing the flicker, and hence the picture signals are temporarily stored in the frame memory 5 to be read at a high speed for display. Further, even if the frame memory 5 is of mass storage which can store 2048 pixels×2048 lines, an ordinary display unit cannot collectively display the whole storage contents as an image, and hence an extremely high-priced display unit of high resolution is required for collective display.

When the display unit 6 as employed is an ordinary one, therefore, the storage contents of the frame memory 5 must be divided into numbers of parts to be sequentially displayed. After all, the conventional image pickup apparatus as shown in FIG. 1 can only partially observe an image under sensing once per 2.66 seconds, and has been extremely inconvenient in operation such as setting of an image sensing range and focus control.

On the other hand, the image pickup apparatus as shown in FIG. 2 has no such problem of the scanning speed since the polygonal reflective mirror 40 can be rotated at a sufficiently high speed. However, the operation speed of the linear image sensor 4 has such an upper limit that the number of scanning lines for image sensing is decreased, and hence the image cannot be sensed in high resolution. The speed of rotation of the polygonal reflective mirror 40 must inevitably be reduced to sense the image in high resolution, whereas, also in this case, the scanning cycle is too long and the ordinary display unit 6 can only partially observe the image similarly to the image pickup apparatus as shown in FIG. 1.

When the aforementioned conventional image pickup apparatus is applied to office automation or factory automation, a region to be noted (hereinafter referred to as a noted region) in an original is preferably specified to be scanned and inputted in high resolution in addition to continuous input of the entire image of the original.

However, the image pickup apparatus as shown in FIG. 1 has a long scanning cycle and can merely partially display the image, and hence the same is inferior in operability for specifying the noted region. Further, an access time for moving a scanned range to the noted region upon specification is not ignorable.

On the other hand, the noted region can be easily specified in the image pickup apparatus as shown in FIG. 2 by rotating the polygonal reflective mirror 40, whereas the noted region cannot be read in high resolution. Further, the polygonal reflective mirror 40 is generally of great mass and hence it is difficult to control the same to abruptly reduce its rotation speed from a state of high speed rotation in order to scan the noted region in high resolution. Thus, this image pickup apparatus is unsuitable for scanning an original with variable scanned ranges and resolution.

SUMMARY OF THE INVENTION

Accordingly, it is an object of the present invention to provide an image pickup apparatus which can easily scan an original at a high speed to immediately observe the entire image thereof as well as specify a noted region in the original to input the noted region in high resolution.

Briefly stated, a rotary scanning mirror is stepwisely rotated by a driving means to scan an object, so that an image sensor senses an image of the scanned object. A detecting means detects rotation angles of the rotary scanning mirror to store picture signals outputted from the image sensor in addresses of a frame memory means corresponding to the detected rotation angles. A position indicating means specifies a scanned range on the object, whereby a control means supplies the rotation angles of the rotary scanning mirror to the driving means so that the rotary scanning mirror scans the specified scanned range, while varying the step size of the rotary scanning mirror thereby to vary resolution.

According to the present invention, therefore, a desired vertical scanning position can be accessed at a high speed within an available scanned range on the object through the rotary scanning mirror, the detecting means for detecting the rotation angles and the control means. Further, line-by-line scanning is enabled by stepwisely varying the rotation angles of the rotary scanning mirror. Through such features, line-by-line scanning can be performed at a relatively high speed to immediately and full-observably display the image of the object thereby to specify a noted region. Further, scanning for inputting the specified noted region in high resolution can be easily realized.

In a preferred embodiment of the present invention, a position indicating means is formed by a display means for displaying an image on the basis of picture signals stored in a frame memory means and a position indicator for specifying a scanned range on the display image.

Therefore, according to the preferred embodiment of the present invention, a noted region can be easily specified by indicating the noted region in the image displayed on the display means.

In a more preferred embodiment of the present invention, a point indicator serving as a position indicating means specifies a scanned range on an object to store picture signals including the point indicator in memory means and process the stored picture signals including the point indicator to detect position coordinates of the point indicator, thereby to specify a noted region.

Therefore, according to the more preferred embodiment of the present invention, the noted region can be easily specified on the object by the point indicator.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
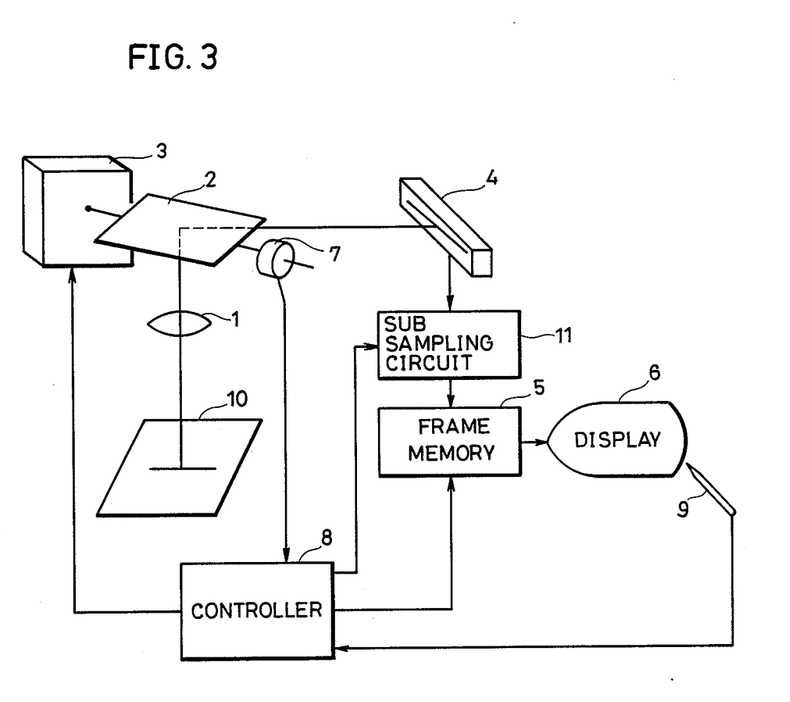
FIG. 3 is a block diagram schematically showing the structure of an embodiment of the present invention.

FIG. 3 is a block diagram schematically showing the structure of an embodiment of the present invention.

Referring to FIG. 3, a rotary scanning mirror 2 is arranged on an image forming plane of a lens 1 for an original 10, and is rotated by a driving unit 3 to sequentially feed an image of the original 10 to a linear image sensor 4. The rotary scanning mirror 2 is prepared by, e.g., a Galvano mirror. A rotation angle detector 7 is provided in relation to the rotary scanning mirror 2 to detect rotation angles of the rotary scanning mirror 2. A controller 8 is adapted to supply signals indicating the rotation angles of the rotary scanning mirror 2 to the driving unit 3 to specify a range to be scanned by the rotary scanning mirror 2, while changing the rotation step size thereby to vary resolution.

A display unit 6 and a position indicator 9 form a position indicating means which outputs a position signal for specifying the scanned range. The position indicator 9 is prepared by, e.g., a light pen. A sub sampling circuit 11 is adapted to reduce the number of pixels in picture signals outputted from the linear image sensor 4 to be in prescribed resolution, so that the same are stored in a frame memory 5.

Operation of the image pickup apparatus according to this embodiment is now described with reference to FIG. 3. A two-dimensional image of the original 10 created through the lens 2 is reflected by the rotary scanning mirror 2, to be formed on the linear image sensor 4. The controller 8 supplies the driving unit 3 with a digital sign or a signal of analog voltage for designating the rotation angle of the rotary scanning mirror 2, which in turn is inclined at the designated angle. Thus, the image of a desired position on the original 10 can be formed on the linear image sensor 4 through the rotary scanning mirror 2. This can be applied to vertical scan operation to perform line-by-line scanning.

The rotation angle detector 7 is formed by a mechanical or optical rotary encoder, and detects the current rotation angle of the rotary scanning mirror 2 to supply a signal indicating the same to the controller 8, which in turn calculates difference between the designated rotation angle and the current rotation angle. The linear image sensor 4 is driven by an image sensor driving circuit (not shown) to sense the image synchronously with vertical scanning. Picture signals outputted from the linear image sensor 4 are stored in the frame memory 5, whose storage contents are displayed as the image on the display unit 6.

The line-by-line scanning is generally enabled by setting the rotation angles of the rotary scanning mirror 2 at the boundaries of the scanned range of the original 10 and then minutely changing the rotation angles stepwisely through the controller 8 to generate rotation angle designating signals at a constant speed. In this case, the size of the scanned range in the vertical scanning direction corresponds to the range of the rotation angles of the rotary scanning mirror 2, and scan resolution corresponds to the minute step size of the rotation angles. Storage addresses in the frame memory 5 are made to correspond to respective scanning lines through the total number of the scanning lines determined by the rotation angle range and the minute step size of the rotation angles and the amount of picture signals included in each scanning line, e.g., the number of pixels per scanning line.

Thus, when the minute step size of the rotation angles is increased, scan operation is performed at a relatively high speed so that the frame memory 5 stores picture signals of low resolution. When, to the contrary, the minute step size of the rotation angles is decreased, the frame memory 5 stores picture signals of high resolution although the scanning time is increased. The resolution can be varied in such a manner.

The lightweight rotary scanning mirror 2 can be driven by the driving unit 3 to be at any rotation angle designated by the controller 8 at a high speed. Therefore, a desired scanned range can be accessed in a short time, thereby to reduce the time for returning to the first boundary of the scanned range every time in order to repeatedly scan the same. Thus, scanning can be easily performed with a variable scanned range.

Figure 4:
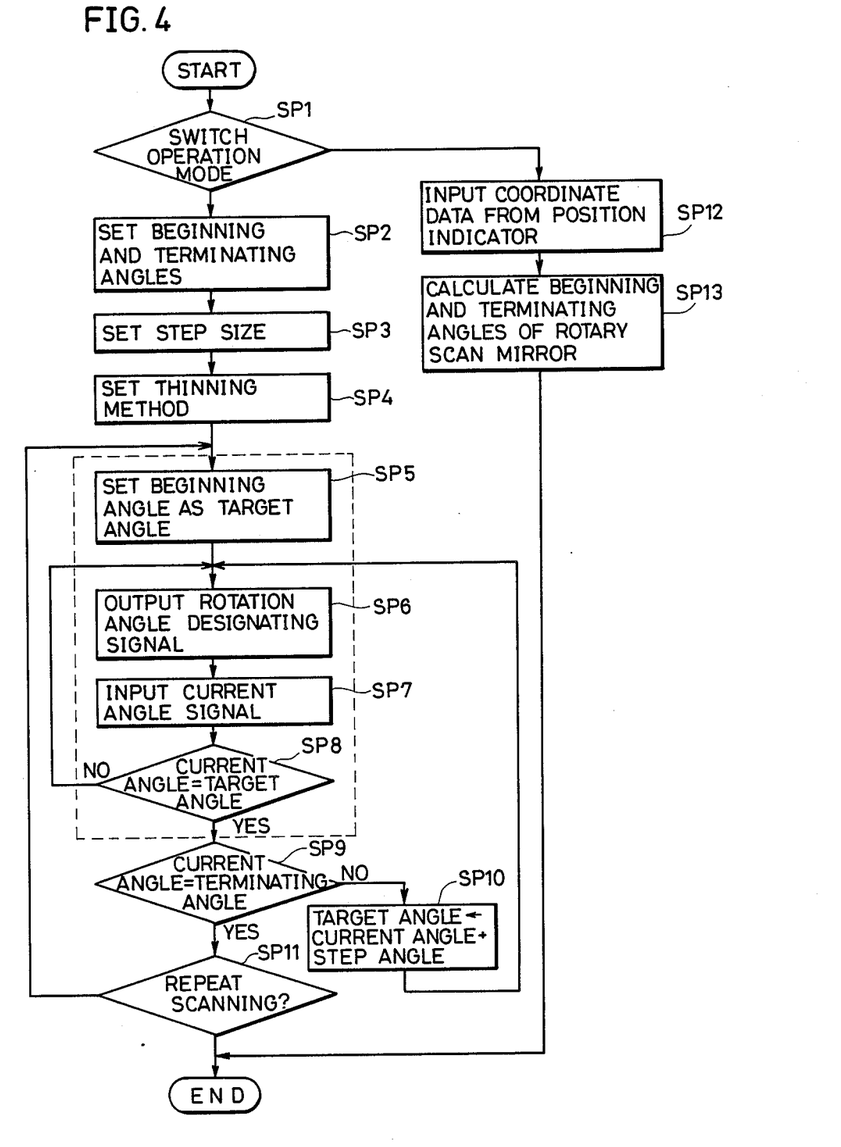
FIG. 4 is a flow chart for definitely illustrating the operation of a controller included in the embodiment of the present invention.

FIG. 4 is a flow chart for definitely illustrating the operation of the controller included in the embodiment of the present invention.

Referring to FIGS. 3 and 4, description is now definitely made on the operation of this embodiment. This embodiment has two operation modes of a scanning mode and a mode for specifying a noted region. These modes are switched by a switch means (not shown) at a step SP1. In the scanning mode, the controller 8 sets the range of rotation angles and step size of the rotary scanning mirror 2 in response to the scanned range of the original 10 at steps SP2 and SP3. For example, the controller 8 sets various rotation beginning and terminating angles and step sizes in order to entirely scan the original 10 at a high speed or scan a noted region in high resolution. At a step SP4, the controller 8 outputs signals indicating a sub sampling ratio and an effective range of signals to be stored in the frame memory 5 to the sub sampling circuit 11.

After the said setting, the controller 8 sets a beginning angle corresponding to the beginning end of the scanned range as a target rotation angle of the rotary scanning mirror 2 at a step SP5, and supplies a signal designating the target angle to the driving unit 3 at a step SP6, whereby the rotary scanning mirror 2 is rotated to be at the target rotation angle. The controller 8 inputs a current rotation angle outputted from the rotation angle detector 7 at a step SP7, and outputs the rotation designating signal until it confirms that the current angle matches the target angle at a step SP8.

If the current angle matches the target angle, the controller 8 determines whether or not the current angle reaches the terminating angle corresponding to the terminating end of the scanned range. If the former does not reach the latter, the controller 8 sets a subsequent target angle by adding the step size to the current angle at a step SP10, and returns to the step SP6. Such operation is repeated to sequentially scan the scanned range from the beginning end to the terminating end at a prescribed step size.

The step size itself is not necessarily constant through the scan operation, and it may be necessary to minutely change the step size of the rotation angles in accordance with the absolute value of the rotation angles to rotate the rotary scanning mirror 2 for scanning the original 10 at a constant step size. In such case, the controller 8 stores changed amounts of the rotation angle step size in the form of a table or performs calculation to set subsequent target angles through the stored or calculated values at the step SP10.

If the controller 8 determines that the current angle reaches the terminating angle at the step SP9 and the scan operation is to be repeatedly executed in the operation mode at the step SP11, the process is returned to the step SP5 to re-execute similar scan operation from the beginning angle. However, if the scan operation is not to be repeated in the operation mode, the said scan operation is terminated. Referring to FIG. 4, a portion boxed by dotted lines corresponds to access operation to the scanned position through the rotary scanning mirror 2, and random access operation can also be performed through the said portion.

In the operation mode for specifying the region, the controller 8 inputs two coordinate values for designating the scanned range from the position indicator 9 at a step SP12, and calculates beginning and terminating angles of the range scanned by rotation of the rotary scanning mirror 2.

In order to specify a noted region of the original 10 as the scanned range, a position indicating means is required to indicate the boundaries of the scanned range on the original 10 or the image displayed on the display unit 6. In the embodiment as shown in FIG. 3, the display unit 6 and the position indicator 9 are employed as the position indicating means. Description is now made on the operation in such case.

Figure 5A:
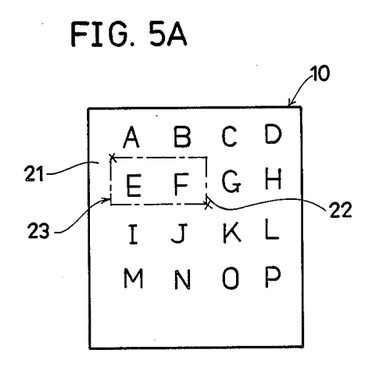
FIG. 5A illustrates the entire image of an original displayed on a display unit.
Figure 5B:
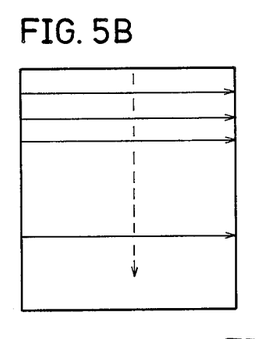
FIG. 5B is a diagram for illustrating scan operation by a rotary scanning mirror.
Figure 5C:
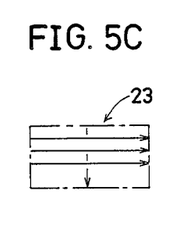
FIG. 5C is a diagram for illustrating a method of scanning a noted region in high resolution.
Figure 5D:
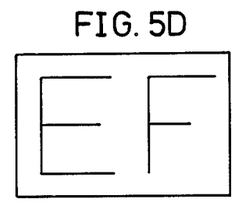
FIG. 5D illustrates an image obtained by scanning the noted region at a high speed.

FIG. 5A illustrates the entire image of the original 10 displayed on the display unit 6 and FIG. 5B is a diagram for illustrating the scan operation by the rotary scanning mirror 2, while FIG. 5C is a diagram for illustrating a method of scanning a noted region in high resolution and FIG. 5D illustrates an image obtained by scanning the noted region at a high speed.

When the original 10 is entirely scanned in relatively high resolution in a line-by-line manner, the entire image of the original 10 is displayed on the display unit 6 through the frame memory 5, as shown in FIG. 5A. In such scan operation, the minute step size of the rotation angles of the rotary scanning mirror 2 is relatively increased as shown in FIG. 5B and the controller 8 generates rotation designating signals at a high speed so far as the linear image sensor 4 can sense image. If the scan operation can be repeated at such a speed that causes no flicker, it is possible to directly input picture signals in the display unit 6 to be displayed thereon without through the frame memory 5. However, the scanning speed may not be so much increased to obtain immediateness sufficient to move the original 10 within an image sensing range and perform focus control, and the original 10 can be observed through the frame memory 5 without flicker.

Of course the display image is that of low resolution which can be displayed on an ordinary display unit, and the contents of the original 10 are not necessarily completely readable, whereas the position of the noted region can be indicated with no problem. A noted region 23 can be easily specified by indicating two diagonal points 21 and 22 thereof on the display image by the position indicator 9. Positions of the diagonal points 21 and 22 are mapped on positions on the original 10 by the controller 8, and further converted into rotation angles of the rotary scanning mirror 2 corresponding to the scanned range in view of ratios to the entire original 10.

Following the aforementioned operation, the controller 8 designates the rotation angles of the rotary scanning mirror 2 to set upper and lower ends of the noted region 23 at the boundaries of the scanned range, thereby to scan the noted region 23 in high resolution as shown in FIG. 5C. Picture signals thus obtained are stored in the frame memory 5, whose storage contents are transferred to a data or file memory (not shown) to complete input operation. The noted region 23 is scanned once by reducing the minute step size of the rotation angle. Through such scan operation, the noted region 23 can be inputted in resolution higher than that in high-speed scanning.

Figure 5E:
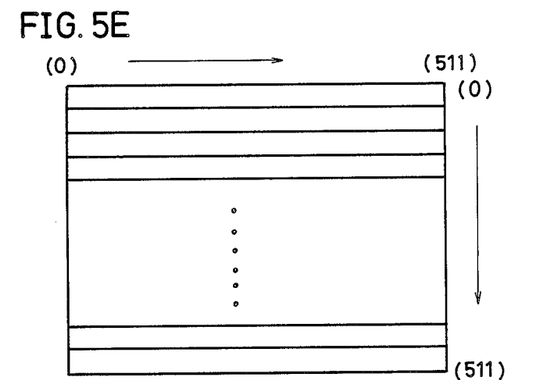
FIG. 5E illustrates an example of a state of storing picture signals in a frame memory during high-speed scan operation.
Figure 5F:
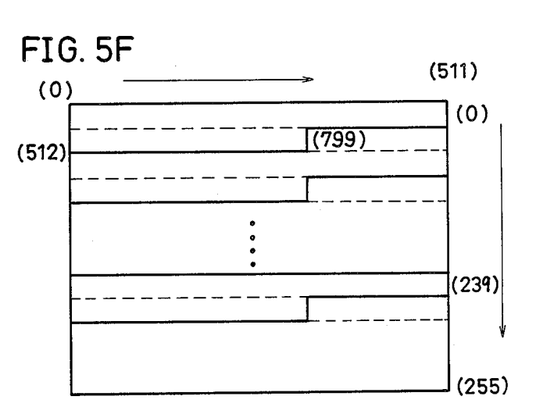
FIG. 5F illustrates an exemplary state of storing picture signals in the frame memory during high-resolution scan operation.

FIG. 5E illustrates an exemplary state of storing picture signals in the frame memory 5 in high-speed scanning, and FIG. 5F illustrates an exemplary state of storing picture signals in the frame memory 5 in high-resolution scanning.

In the high-speed scanning, the entire original 10 is scanned with 512 lines, and the picture signals are systematically stored in the frame memory 5 in units of 512 addresses corresponding to 512 pixels per line. The storage contents are read at a prescribed display speed, to display an image on the display unit 6. The number of pixels per line is originally determined by the number of pixels included in the linear image sensor 4, and 2048 pixels are outputted as picture signals per line by employing a linear image sensor having 2048 pixels. In the high-speed scanning, resolution in the main scanning direction may substantially correspond to that in the vertical scanning direction in general.

The aforementioned sub sampling circuit 11 as shown in FIG. 3 is adapted to thin the pixels in the picture signals in such case, thereby to properly reduce the number of pixels per line. In the example of FIG. 5E, 2048 pixels outputted from the linear image sensor 4 are sub-sampled in the ratio of one to four pixels, so that the frame memory 5 stores 512 pixels. Assuming that the noted region 23 is in the ratio of 15/512 by 25/64 to the entire original 10, the noted region 23 itself is scanned with 200 pixels ×60 lines.

When the high-resolution scanning is performed with vertical scan resolution increased by four times, the noted region 23 is scanned with 240 scanning lines and the number of corresponding horizontal pixels is 800, and hence the picture signals are not systematically stored in the units of 512 addresses as shown in FIG. 5F, but stored with two units allocated to one line. This resolution corresponds to such case of sensing the image of the original 10 along the horizontal direction through all of 2048 pixels of the linear image sensor 4, and hence the sub sampling circuit 11 performs no thinning of one to several pixels but eliminates pixels corresponding parts of the picture signals other than those in the noted region 23, thereby to transmit only 800 pixels of the noted region 23 to the frame memory 5.

The controller 8 supplies signals indicating positions of the pixels in regions in the line and the ratio of required thinning to the sub sampling circuit 11, which in turn performs the aforementioned operation by a well-known method. Thus, rear addresses are vacated per two units of 512 addresses in the frame memory 5 as shown in FIG. 5F, and the storage contents are inputted not as the object of display on the display unit 6 but merely as picture signals, and hence the lines are regularly partitioned by such storing method.

Although the number of pixels in the linear image sensor 4, the sizes of the original 10, the noted region 23 and the frame memory 5 and the like are definitely stated in the above description, these are not restricted to the stated values but can be generalized, as a matter of course.

The above description has been made with respect to the case of horizontally sensing the image of the entire original 10 through the whole pixels of the linear image sensor 4 in scanning of the noted region 23. However, such is not necessarily a method of obtaining the maximum resolution for scanning the noted region 23, but the noted region 23 can obviously be scanned in higher resolution by correcting the focus of the lens 1 etc. to partially sense the image of the original 10 through the whole pixels of the linear image sensor 4.

Further, it is easily understood that scanning can generally be performed with scan resolution as an independent variable with respect to a scanned range set in the original 10, if the frame memory 5 has sufficient capacity.

In the aforementioned embodiment, the number of pixels is reduced in the picture signals outputted from the linear image sensor 4 by thinning or elimination through the sub sampling circuit 11 in order to obtain main scan resolution substantially corresponding to the vertical scan resolution for scanning the original 10 or the noted region 23. However, such processing is performed in order to retain the frame memory 5 in small storage capacity, and the same can be omitted if the frame memory 5 has sufficient capacity and the image can be displayed on the display unit 6 through sub sampling etc. in reading from the frame memory 5. Further, the number of pixels may not necessarily be reduced to a degree corresponding to the vertical scan resolution in case of performing sub sampling, but the sub sampling can be independently performed within a range allowable by the capacity of the frame memory 5.

Figure 6:
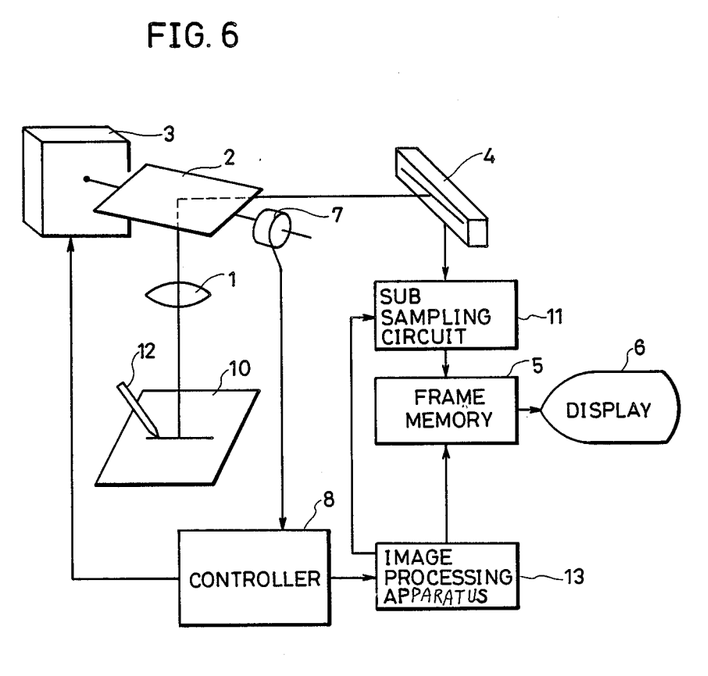
FIG. 6 is a block diagram schematically showing the structure of a second embodiment of the present invention.

FIG. 6 is a block diagram schematically showing the structure of a second embodiment of the present invention.

The embodiment as shown in FIG. 6 is substantially identical in structure to that shown in FIG. 3, except for that a point indicator 12 is provided in place of the position indicator 9 in order to specify noted regions on an original 10 and an image processing apparatus 13 is provided to detect images of the point indicator 12 stored in a frame memory 5 thereby to detect coordinates of points in the noted regions indicated by the point indicator 12 from storage addresses of specified parts. A controller 8 determines positions of the point indicator 12 on the original 10 from detection signals outputted from the image processing apparatus 13, to input position coordinate data in a calculator or the like. Times for inputting the coordinate data are distinguished from non-input times by a switch (not shown) provided in the point indicator 12 or the like.

Scan operation by a rotary scanning mirror 2, a method of scanning the noted regions in high resolution and a state of storing picture signals in the frame memory 5 in high-speed scanning in this embodiment are identical to those described above with reference to FIGS. 5A to 5E, and hence description thereof is omitted.

Figure 7:
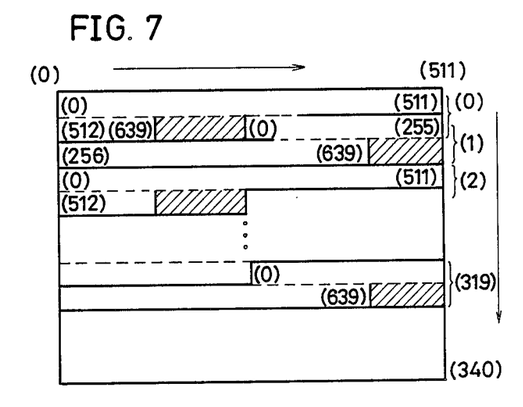
FIG. 7 illustrates an exemplary state of storing picture signals by scanning noted regions in minute steps in the second embodiment of the present invention.

FIG. 7 illustrates an exemplary state of storing picture signals in case of scanning the noted regions in minute steps in the second embodiment. Assuming that the size of the original 10 is, for example, 25 cm×25 cm while the noted regions are in the ratio of ¼ by ¼ to the entire original 10 and scanned in resolution of about 5 pixel/mm of 2.5 times as scanned ranges, picture signals of 640 pixels×320 lines are stored in the frame memory 5 as shown in FIG. 7. Slant lines in FIG. 7 denote vacant parts of the frame memory 5. In this case, a linear image sensor 4 senses the image of the original 10 over the entire width of 25 cm along the main (horizontal) scanning direction, and a sub sampling circuit 11 performs sub sampling to select five from eight pixels of the picture signals outputted from the linear image sensor 4 while eliminating ¼ pixels being out of the ranges of the noted regions, thereby to obtain 640 pixels.

Or, the focus etc. of a lens 1 may be so controlled that the linear image sensor 4 senses the image along lateral width of 40 cm including the entire original 10 and the sub sampling circuit 11 eliminates pixels other than those within the ranges of the noted regions from the picture signals outputted from the linear image sensor 4, thereby to select 640 pixels to be stored in the frame memory 5. The point is that the resolution can be converted to a prescribed level through the sub sampling circuit 11 by sensing the entire image of the original 10 in main scan resolution sufficient for the noted regions. In order to perform sub sampling operation responsive to the sizes of the scanned ranges and the scan resolution by a well-known method, the controller 8 supplies the sub sampling circuit 11 with values obtained by converting an available image sensing range (lateral width) of the linear image sensor 4 and the positions and sizes of the noted regions into a position in the pixel array on the linear image sensor 4 and a required sub sampling ratio as signals.

Figure 8A:
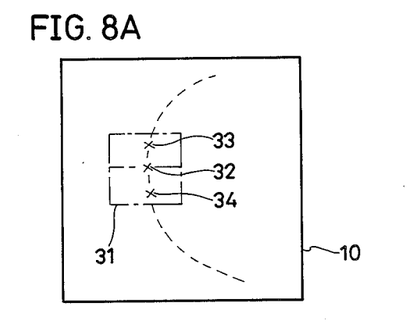
FIGS. 8A and 8B are diagrams for illustrating a method of inputting coordinate data of noted regions through a point indicator included in the second embodiment of the present invention.
Figure 8B:
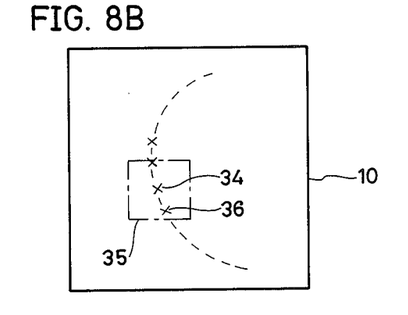

FIGS. 8A and 8B are diagrams for illustrating a method of inputting the coordinate data of the noted regions through the point indicator 12 included in the second embodiment of the present invention.

With reference to FIGS. 8A and 8B, description is now made on the method of inputting the coordinate data of the noted regions.

For convenience of illustration, the following description is made with respect to such case where the point indicator 12 performs no drawing in the original 10. In this case, the image processing apparatus 13 processes the picture signals obtained in the frame memory 5 through the scan operation and image sensing as hereinabove described to detect the positions of the forward end of the point indicator 12 by a method such as pattern matching, thereby to input point coordinate data once for every frame. Referring to FIG. 8A, it is assumed here that a noted region 31 in the ratio of about ¼ by ¼ to the original 10 is set in the process of movement of the point indicator 12, while coordinate data of a point 32 are inputted in a prepositive frame and those of a point 33 are inputted in a frame prepositive thereto. The controller 8 calculates the direction of movement of the point indicator 12 from the point 33 to the point 32, to set a scanned range in a subsequent frame in the said direction. When the point indicator 12 is continuously moved, the controller 8 so determines the position of the noted region 31 as to sufficiently include coordinates predictably detected in the subsequent frame. In an extremely simple position predicting method, the controller 8 sets the noted region 31 to sufficiently cover a position point-symmetrical to the point 33 with respect to the point 32.

The size of the noted region 31 and a relative position with respect to the predicted position of the point indicator 12 are to be determined by the direction of movement of the point indicator 12 and the amount of changes in the speed of movement thereof.

It is simply assumed here that the noted region 31 in the ratio of ¼ by ¼ to the original 10 is set about the point 32 in which the point indicator 12 is positioned in the prepositive frame. When coordinate data of a point 34 are inputted through scanning and image processing of the noted region 31 thus set, a scanned range with respect to a subsequent frame is set in a noted region 35 about the point 34 as shown in FIG. 8B, to detect a point 36 in which the point indicator 12 is subsequently positioned.

The position of a noted region to be subsequently scanned is thus determined in accordance with the position of the point indicator 12 obtained by scanning a noted region once and performing image processing, whereby coordinate data are inputted such that noted regions trace the point indicator 12. On condition that the sizes of the noted regions and scan resolution therein are properly selected, the coordinate data can be inputted at a higher speed and in higher resolution in comparison with the case of repeatedly scanning the entire original 10.

In this case, the rotary scanning mirror 2 is repeatedly rotated to be in a minute step size of the same rotation angle while sequentially changing the range of rotation for scanning in accordance with rotation angle designating signals outputted from the controller 8. The sub sampling circuit 11 eliminates the pixels out of the scanned ranges and performs sub sampling in accordance with signals outputted from the controller 8 for indicating the ranges of the noted regions and the sub sampling ratio. The image processing apparatus 13 detects the images of the point indicator 12 and outputs addresses of the frame memory 5 storing picture signals corresponding to specific parts such as the forward end thereof to the controller 8.

Figure 9:
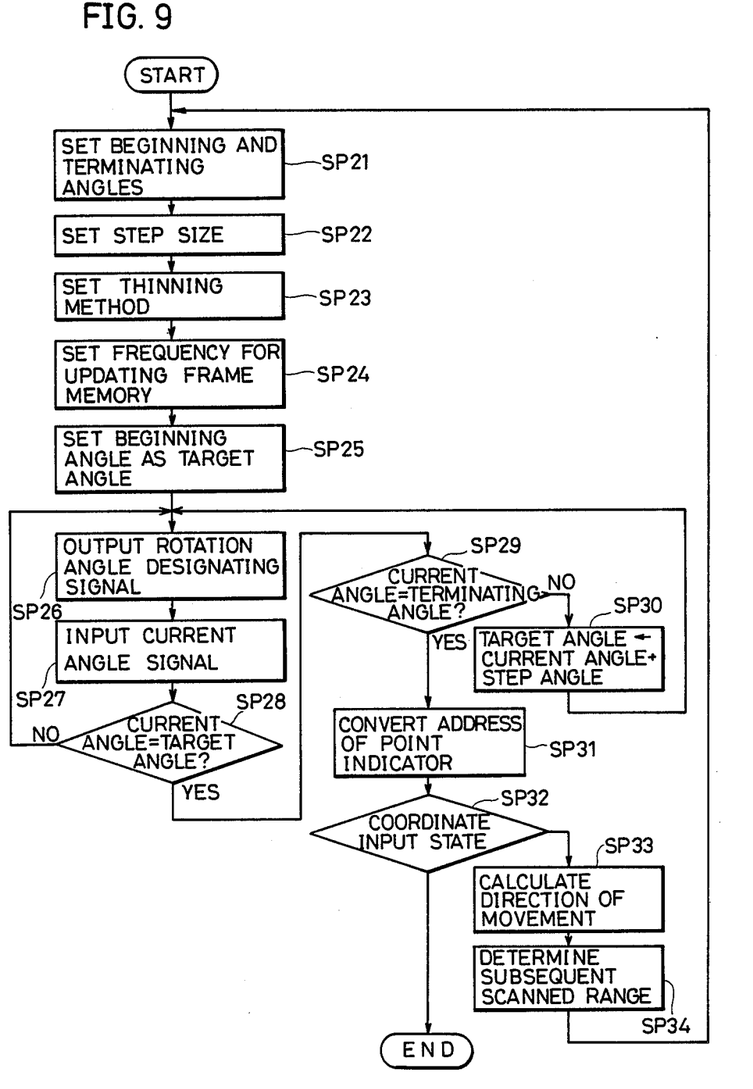
FIG. 9 is a flow chart for definitely illustrating the operation of a controller in the second embodiment of the present invention.

FIG. 9 is a flow chart for illustrating the operation of the controller 8 included in the second embodiment of the present invention.

Referring to FIG. 9, the operation of the controller 8 is now described. In correspondence to a scanned range of the original 10, the controller 8 sets the range of the rotation angles of the rotary scanning mirror 2 and the step size of the rotation angles at steps SP21 and SP22. For example, the controller 8 sets different beginning and terminating angles and step sizes in order to scan the entire original 10 at a high speed or scan a small range in high resolution. At a step SP23, the controller 8 outputs signals indicating the sub sampling ratio and an effective range of signals to be stored in the frame memory 5. At a step SP24, the controller 8 outputs a signal for indicating frequency or timing for updating the picture signals stored in the frame memory 5.

After the aforementioned setting, the controller 8 sets a beginning angle as the target rotation angle of the rotary scanning mirror 2 at a step SP25, and supplies a signal designating the target angle to the driving unit 3 at a step SP26. Thus, the rotary scanning mirror 2 is rotated to be at the target rotation angle, and the controller 8 receives, output from the rotation angle detector 7 to recognize the current angle at a step SP27, to continuously output the same rotation angle designating signal until it confirms that the current angle matches the target rotation angle at a step SP28. When a determination is made that the current angle matches the target angle, the controller 8 determines whether or not the current angle reaches the terminating angle at a step SP29. If the determination is of no, the controller 8 adds the rotation step size to the current angle at a step SP30 to set the same as a subsequent target angle, and returns to the step SP26. The steps SP26 to SP30 are repeated to sequentially scan through the beginning to terminating ends of the scanned range at a prescribed step size.

When a determination is made that the current angle reaches the terminating angle at the step SP29, the controller 8 receives a detected position (address on the frame memory 5) of the image of the point indicator 12 from the image processing apparatus 13 at a step SP31, to calculate the position on the original 10, i.e., coordinates of the designated point from the address on the frame memory 5 through the data such as the scanned range and the step size. Thus, coordinate input of one time is obtained. The controller 8 determines that the coordinate input state is further continued at a step SP32, to be advanced to scanning for subsequent coordinate input. If coordinate data are not inputted, the coordinate input operation is terminated.

In order to input subsequent coordinate data, the controller 8 calculates the position of movement of the point indicator 12 from coordinate positions thereof detected in an image (prepositive frame) sensed by prepositive scanning and an image (current frame) sensed by current scanning at a step SP33. On the basis thereof, the controller 8 determines a subsequent scanned range at a step SP34 and returns to the step SP21 to start subsequent scanning.

As obvious from the above description, a portion boxed by dotted lines in FIG. 9 (steps SP25 to SP28) corresponds to access operation to the scanned position through the rotary scanning mirror 2. A portion boxed by one-dot chain lines in FIG. 9 (steps SP21 to SP30) corresponds to line-by-line scanning through the rotary scanning mirror 2. Random access operation can be performed through the access operation, and tracing scanning can be performed through the line-by-line scanning.

It is to be noted that the rotation step size is not necessarily constant during a cycle of scanning in the above description. This is because it may be necessary to change the step size of the rotation angle of the rotary scanning mirror 2 by minute amounts along the absolute value of the rotation angles in order to scan the original 10 in a constant step size. In such case, the controller 8 stores the changes in the step size of the rotation angles in the form of a table or calculates the step size from the absolute value of the rotation angles to set a subsequent target angle through the stored or calculated value at the step SP30.

Figure 10A:
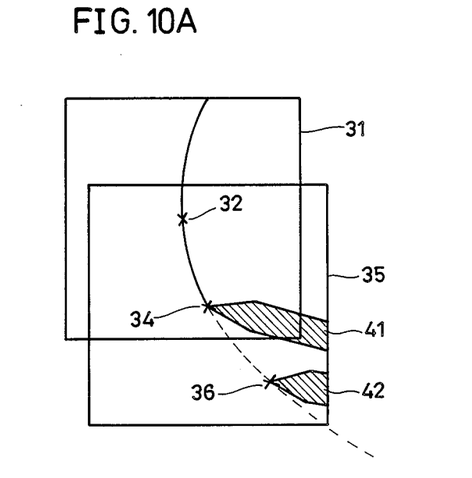
FIGS. 10A and 10B illustrate image processing for coordinate input operation in the second embodiment of the present invention.
Figure 10B:
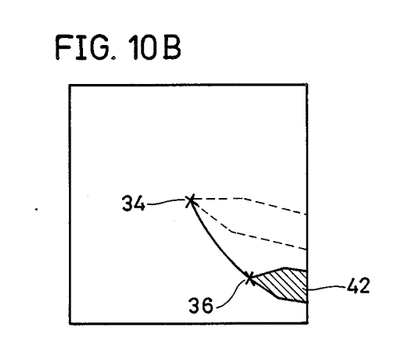

FIGS. 10A and 10B are diagrams for illustrating coordinate input operation.

In the following description, the point indicator 12 performs drawing in the original 10 differently from the case of FIGS. 8A and 8B. In the example as shown in FIGS. 10A and 10B, positions of noted regions are set in a similar manner to FIGS. 8A and 8B. However, drawn contents and images of the point indicator 12 are simultaneously sensed, and FIGS. 10A and 10B partially illustrate processing for separating the same through the image processing apparatus 13.

Referring to FIGS. 10A and 10B, numerals indicating points and noted regions are identical to those in FIGS. 8A and 8B, whereas sensed are an image (portion with slant lines) 41 of the point indicator 12 and the drawn content (portion with solid lines in the locus of the forward end of the point indicator 12). Obtained in a noted region 31 are the drawn content to a point 34 and the image 41 (picture signal of this frame is indicated by A) of the point indicator 12. Obtained in a noted region 36 are the drawn content to a point 36 and an image 42 (picture signal in this frame is indicated by B) of the point indicator 12.

Logical operation is executed in a circuitry manner to obtain the logical product of $\overline{A}$ B (logical product of inverted image of A and B, assuming that A and B are signals of binarized logical values) through the picture signals A and B, so as to cancel the drawn content to the prepositive frame and the image of the point indicator 12. Thus, only the drawn content from newly drawn points 34 to 36 and the image 42 of the point indicator 12 in the new frame remain, and thin lines (points 34 to 36) of the new drawn content and the image 42 of the point indicator 12 can be readily separated by space filtering for erasing the thin lines. Therefore, the coordinates of the point 36 indicated by the forward end of the point indicator 12 are detected from the frame sensed through the noted region 35.

Although it is necessary to recognize corresponding parts in the picture signals in two frames in order to perform logical operation between the two frames in the example as shown in FIGS. 10A and 10B, operation can be easily performed with correspondence of picture signals of frames subsequent on the frame memory 5 since the controller 8 recognizes the central positions of the two frames.

Although the point indicator 12 is formed by a light pen whose shape is detected by the image processing apparatus 13 in the above description, the point indicator 12 may be formed by any other means on condition that the same can be separated and identified from picture signals in the image processing apparatus 13. For example, a thin cross-shaped member may be employed to detect the intersection point thereof by the image processing apparatus 13, or a light emitting element such as an LED may be provided on a pen point to detect a high luminance peak value in picture signals through the image processing apparatus 13. Further, the linear image sensor 4 may be formed by a member capable of color input such as a linear image sensor with a color filter to perform color identification in the image processing apparatus 13 through a pen-type point indicator differently colored from the original 10, thereby to detect the point indicator 12 for coordinate input.

Although the size and the method of setting the positions of the noted regions moved to trace the point indicator 12 are definitely stated in the above description, the same are not restricted to the illustrated size and setting method but can be properly selected in response to the manner of moving the point indicator 12.

Further, the sub sampling circuit 11 is adapted to reduce the amount of picture signals stored in the frame memory 5 in the above description. However, if the frame memory 5 itself has sufficiently large storage capacity and required sub sampling processing and high-speed processing are executed in stages of display and image processing, the sub sampling circuit 11 for reducing the number of pixels may be deleted from between the linear image sensor 4 and the frame memory 5. In addition, the image pickup apparatus according to the present invention can also be employed as an ordinary image scanner, to obtain an apparatus also serving as a coordinate input device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pickup apparatus for acquiring an image of an object, said image pickup apparatus comprising:
   a rotary scanning mirror stepwisely rotated to scan said object;
   driving means for driving said rotary scanning mirror;
   an image sensor for sensing said image on said object scanned by said rotary scanning mirror;
   detecting means for detecting rotation angles of said rotary scanning mirror;
   frame memory means for storing picture signals outputted from said image sensor in addresses corresponding to said rotation angles detected by said detecting means;
   position indicating means for specifying a scanned range on said object; and
   control means for supplying rotation angles of said rotary scanning mirror to said driving means so that said rotary scanning mirror scans said specified scanned range on the basis of a position indicating signal for specifying said scanned range specified by said position indicating means while varying the step size of said rotary scanning mirror thereby to vary resolution.

2. An image pickup apparatus in accordance with claim 1, wherein
   said position indicating means comprises:
   display means for displaying said image on the basis of said picture signals stored in said frame memory means, and
   a position indicator for specifying said scanned range on said image displayed on said display means.

3. An image pickup apparatus in accordance with claim 1, wherein
   said position indicating means includes a point indicator for specifying said scanned range on said object,
   said control means includes means for driving said rotary scanning mirror by said driving means so that said rotary scanning mirror scans said scanned range specified by said point indicator,
   said frame memory means includes means for storing picture signals including said point indicator,
   said image pickup apparatus further including image processing means for processing said picture signals including said point indicator stored in said frame memory means to detect position coordinates of said point indicator.

4. An image pickup apparatus in accordance with claim 1, wherein
   said control means includes means for varying the step size of rotation of said rotary scanning mirror thereby to vary resolution.

5. An image pickup apparatus in accordance with claim 3, wherein
   said control means includes means for determining a specific region to be subsequently scanned in accordance with the position of said point indicator to trace movement of said point indicator.

6. An image pickup apparatus in accordance with claim 1, further including sub sampling means for reducing the number of pixels so that said picture signals outputted from said linear image sensor are in prescribed resolution to be stored in said frame memory means.

* * * * *